United States Patent [19]

Bryan et al.

[11] 4,317,138
[45] Feb. 23, 1982

[54] METHOD AND APPARATUS FOR FACSIMILE SHEET HANDLING

[75] Inventors: T. James Bryan, Altamonte Springs; George W. Hartman, Longwood; Arthur G. Wilson, Maitland, all of Fla.

[73] Assignee: Exxon Research & Engineering Co., Florham Park, N.J.

[21] Appl. No.: 120,317

[22] Filed: Feb. 11, 1980

[51] Int. Cl.³ .............................................. H04N 1/08
[52] U.S. Cl. .................................... 358/291; 358/256; 346/125; 346/138; 271/110; 271/259; 271/265
[58] Field of Search ....................... 358/293, 291, 256; 271/259, 258, 3, 265, 110; 346/125, 138

[56] References Cited

U.S. PATENT DOCUMENTS

| | | | |
|---|---|---|---|
| 3,808,603 | 4/1974 | Degreve et al. | 346/125 |
| 3,948,510 | 4/1976 | Iwamoto et al. | 271/258 |
| 4,135,198 | 1/1979 | Fujimoto et al. | 358/291 |

FOREIGN PATENT DOCUMENTS

| | | |
|---|---|---|
| 918008 | 2/1963 | United Kingdom . |
| 1088859 | 10/1967 | United Kingdom . |
| 1439083 | 6/1976 | United Kingdom . |

OTHER PUBLICATIONS

E. C. Korte et al., "Sheet-Feed Sensing", Jun. 1977, I.B.M. Tech. Discl., vol. 20, No. 1, p. 25.

Primary Examiner—Jin F. Ng
Assistant Examiner—Edward L. Coles

[57] ABSTRACT

Disclosed herein is a facsimile apparatus with an improved sheet transport means including a transport path and a feeder in the path for moving sheets along it to a scanner. A sensor is situated in the path for sensing the length of the sheets being fed to the scanner. The sensor is utilized for detecting the length of the document such that it may be removed from the scanner by engaging the trailing edge of the sheet.

15 Claims, 17 Drawing Figures

METHOD AND APPARATUS FOR FACSIMILE SHEET HANDLING

BACKGROUND OF THE INVENTION

This invention relates to facsimile transmitters and receivers of the type utilized to transmit and receive information-bearing signals representing dark/light variations on a document located at the transmitter and converting the information-bearing signals to marks or images on a copy medium located at a receiver so as to form a copy which is a reasonable facsimile of the original document.

Most facsimile transmitters and receivers in commercial use at the present time are supplied with document or copy medium sheets by hand. In other words, an operator takes an individual sheet of paper, whether the individual document or a blank piece of copy medium, and places that sheet on or in the scanning means of the transmitter receiver, typically a drum having a clamp for clamping one edge of the sheet. In some facsimile transmitters and receivers, sheet feeding is automated to varying degrees. However, automated sheet feeding becomes difficult where the size of the documents vary from sheet to sheet. In many instances, a variation in sheet to sheet sizes is accommodated by utilizing a document carrier in which the various sized documents are sandwiched. However, the use of a document carrier can be burdensome in many instances.

When a document carrier is not utilized, any nonuniformity of sheet size may create considerable difficulty. One such difficulty can arise when efforts are made to remove the sheet from the scanning means. Where the scanning means comprises a rotatable drum and the sheet is wrapped around the drum, the final position of the drum after scanning becomes important in removing the sheet from the drum. Where the sheet is removed by engaging the sheet adjacent the clamping area of the drum, the drum may be returned to the same position and the sheet may be reliably removed. However, the sheet may not be reliably removed by engaging the trailing edge of the sheet removed from the clamp when the drum is returned to the same position time after time since the overall length of the sheet around the drum will vary with the sheet size. The position of the means for removing the sheet will not be appropriately located with respect to the trailing edge.

SUMMARY OF THE INVENTION

It is an object of this invention to provide a method and apparatus for handling facsimile sheets of various sizes.

It is a more specific object of this invention to provide method and apparatus for removing sheets from a facsimile scanning means regardless of sheet size.

In accordance with these and other objects of the invention, a preferred embodiment of the invention comprises a facsimile apparatus including scanning means adapted to scan a sheet and improved sheet transport means. The sheet transport means includes a transport path for feeding sheets to the scanning means, feed means in the transport path for moving sheets along the path to the scanning means and sensor means in the transport path for sensing the length of the sheets.

In the preferred embodiment of the invention, the scanning means comprises a rotatable drum for carrying a sheet transported to the scanning means. The transport means includes means for engaging a sheet carried by the drum for removing the sheet from the drum and means for controlling the position of the drum in response to the sensor means so as to position one edge of the sheet adjacent to the means for removing the sheet. The means for removing the sheet may comprise roller means adapted to engage the trailing edge of the sheet once the drum has been properly positioned in response to the length of the sheet.

In the preferred embodiment of the invention, the drum may include a clamping means for engaging the leading edge of the sheet. A sensor means may be located adjacent to the drum so as to permit a piece to be fed through the peripheral transport paths and to emerge in advance of the sensor means located adjacent to the drum.

DETAILED DESCRIPTION OF A PREFERRED EMBODIMENT

Figures 1, 1A:
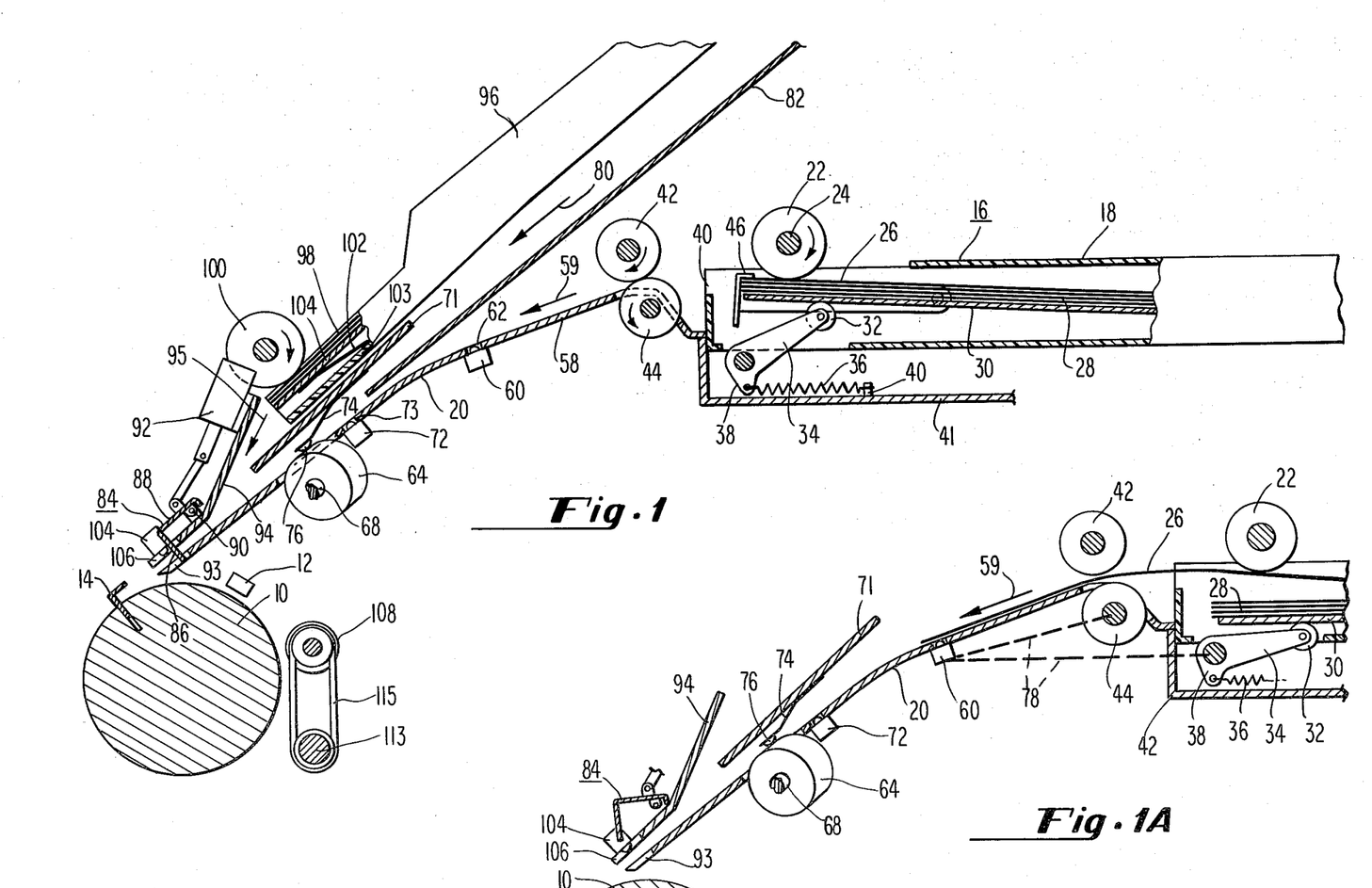
FIG. 1 is a sectional view through a facsimile transceiver apparatus representing a preferred embodiment of the invention.
FIG. 1A is a sectional view of FIG. 1 a short time later in the feeding sequence.

Referring to FIG. 1, a preferred embodiment of the invention comprises a facsimile transceiver capable of transmitting and receiving information-bearing signals representing dark/light variations on a document. The transceiver includes a sheet scanning means comprising a drum 10 juxtaposed to a scanning head 12. The drum 10 is adapted to rotate about the drum axis as the head 12 moves in a direction parallel with the drum axis so as to scan a sheet carried by the drum in a helical fashion such that the sheet is scanned on a line-by-line basis. The drum 10 includes a clamp 14 shown in the open position which is adapted to receive the leading edge of a sheet and clamp the leading edge against the drum 10. As the drum 10 rotates, the sheet is wrapped around the drum 10.

In accordance with the invention of copending application, Ser. No. 120,337 filed Feb. 11, 1980, improved sheet transport means are provided including a sheet storage means 16 adapted to store a stack of sheets in a bin or cassette 18. In accordance with invention, means are provided to reliably feed sheets from the cassette 18 along a transport path 59 to the drum 10.

In accordance with the invention of copending application Ser. No. 120,337 filed Feb. 11, 1980, this reliability in sheet feeding from the cassette 18 is achieved in part by the use of scuff roller means 22 mounted a rotating shaft 24 which is adapted to engage the leading edge of the topmost sheet 26 in a stack 28 as shown in FIG. 1.

As shown in FIG. 1, the stack 28 is elevated to a position such that the topmost sheet 26 is engaged by the roller means 22 by virtue of a plate 30 which, at the forwardmost area is supported by a roller 32 rotatably mounted on a spring-biased lever 34. Spring bias is provided by a spring 36 which is attached to an arm 38 and a peg 40 mounted on the base 41 of the sheet storage means 16.

As also shown in FIG. 1, the topmost sheet 26 is maintained in contact with the scuff roller 22. As the scuff roller 22 rotates, the topmost sheet 26 is forced forward out of the cassette 18 at an opening 40. Rollers 42 and 44 which will now be described in detail are located immediately in front of the opening 40.

In accordance with the invention of the aforesaid copending application Ser. No. 120,337 filed Feb. 11, 1980, the rollers 42 and 44 are driven so as to rotate in the same direction at the sheets 26 as the upper roller 42 engages the topside of the sheets 26 and the lower roller 44 engages the bottomside of the sheets. In accordance with one important aspect of that invention, the rollers 42 and 44 are driven at different speeds with the topmost roller 44 rotating at a faster speed, i.e., angular velocity, than the lowermost roller 44. Preferably the roller 42 is driven at 2.5 to 3.66 times the velocity that the roller 44 is driven. In those instances where two sheets 26 are inadvertently fed through the rollers 42 and 44, the topmost sheet will be accelerated with respect to the lowermost sheet thereby separating the two sheets. This separation is, in most instances, earlier achieved by utilizing corner separators 46 in the forward most location of the stack of sheets 26 which will be described in substantially more detail with reference to FIGS. 8-10.

Figure 8:
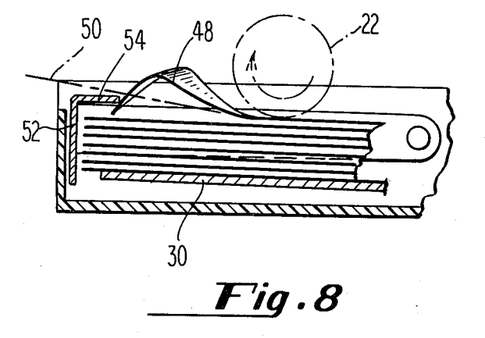
FIG. 8 is an enlarged view of a portion of the sheet storage area shown in FIG. 1 taken along line 8—8 of FIG. 9.
Figure 9:
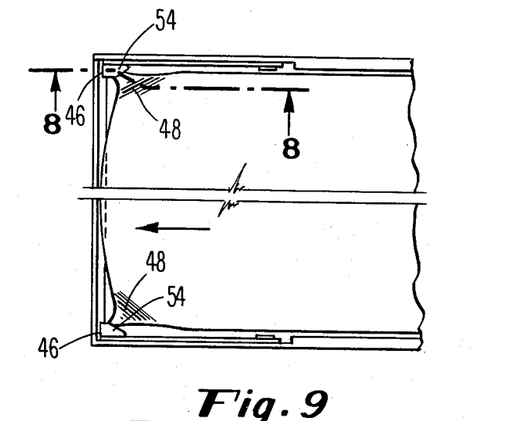
FIG. 9 is a planned view of the sheet storage area shown in FIG. 1.
Figure 10:
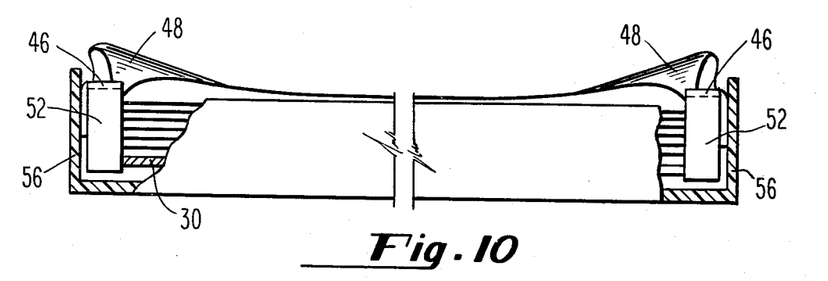
FIG. 10 is a partial sectional view of the front of the sheet storage area shown in FIG. 9.

As shown in FIGS. 8-10, a pair of corner separators 46 are located in the forwardmost area of the cassette 18 so as to engage the corners of the uppermost sheets in the stack 28. As the scuff roller 22 moves the topmost sheet 26 forward, the leading edge of the sheet 26 begins to buckle as shown in FIG. 8. Ultimately, the buckling region 48 of the sheet 26 rides over the corner separator 46 as depicted by the dotted line 50. At that time, the top-most sheet 26 is free to advance outwardly toward the rollers 42 and 44.

In order to properly serve the corner separating function, the corner separators 46 include a forwardmost vertical section 52 and an upper horizontal section 54. It will be readily appreciated that the vertical section 52 restrains the forward movement of the topmost sheets 26 in the stack 28 except for the topmost sheet 26 which begins to buckle in the area 48 as shown in FIG. 8. As the scuff roller 22 continues to drive the topmost sheet 26, the buckling region 48 will finally clear the section 54. However, under some circumstances, the topmost sheet 26 as well as the sheet beneath may ride over the corner separator 46. This of course will result in the feeding of two sheets by the scuff roller 22 simultaneously. However the differential speeds of the rollers 42 and 44 will accelerate the top sheet with respect to the sheet immediately beneath so as to assure a single sheet feed to the drum 10. As shown in FIG. 10, the size of the sheets 26 and the stack 28 are restrained by vertical guides 56. The guides 56 also serve to support the corner separators 46.

Referring now to FIG. 1A, the sheet 26 is advanced along a downwardly inclined slide 58 forming a path 59 by the movement of the rollers 42 and 44. In accordance with the invention of copending application Ser. No. 120,461 filed Feb. 11, 1980, the individual sheets 26 are transported down the incline 58 under the force provided by the rollers 42 and 44 until such time as the feeding is interrupted so as to prelocate the sheets 26 in the position shown in FIG. 2 short of the drum 10. This prelocating of the sheets is necessary in order to maintain the individual sheets in a state of readiness so as to allow feeding to the drum 10 in a very short period alloted by the CCITT Standards, i.e. 3 seconds.

Figure 2:
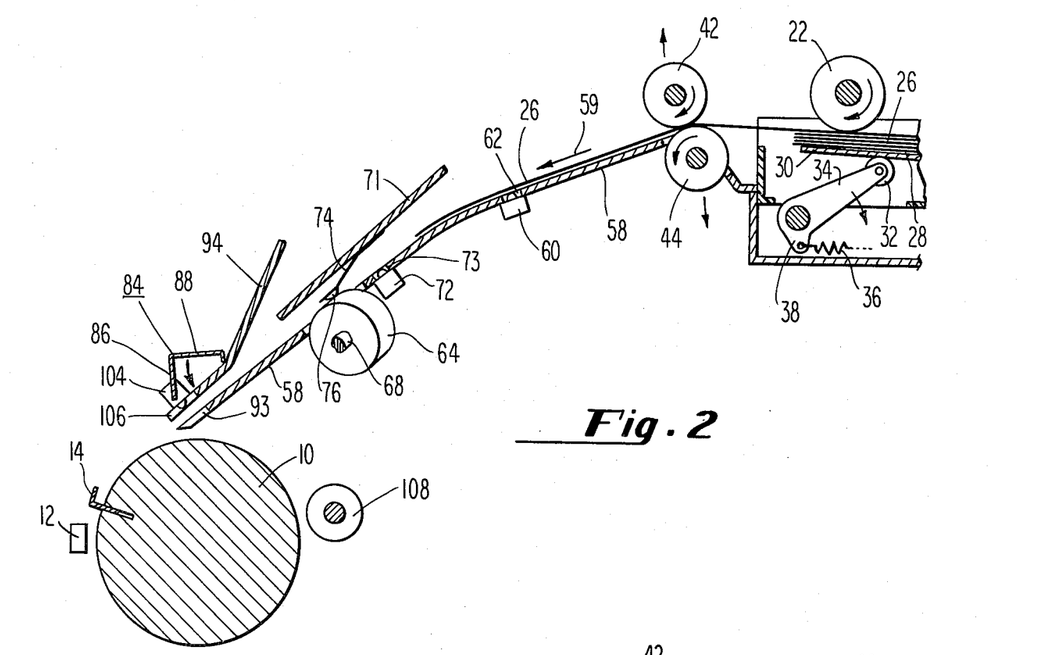
FIG. 2 is a sectional view of FIG. 1A showing the sheet feeding sequence a short time later.

In order to interrupt the feeding of the sheets 26, a sensor 60 is provided in optical communication with the sheet 26 through the guide 58. For this purpose, a small opening 62 in the guide 58 is provided. Upon detection by the sensor 60, the rotation of the rollers 42 and 44 is interrupted and the rollers 42 and 44 are separated to allow the paper to arrive in squaring itself up. The rollers 42 and 44 return to a state of engagement with the sheet 26 as shown in FIG. 2 when a signal is received indicating that the apparatus is ready to receive a facsimile transmission. Rotation of the rollers 42 and 44 is resumed and the sheet is advanced down the inclined guide 58 to the position shown in FIG. 3. However, it will be appreciated that the sheet 26 will be fed to the position shown in FIG. 2 at a time when the drum 10 and the clamp 14 is not prepared to received the sheet 26. For this reason, the drum 10 is depicted as rotating in FIG. 2 and the clamp 14 is closed. It will also be appreciated that the feeding of the sheet 26 to the position shown in FIG. 2 may occur during the removal of sheet from the drum 10 which will be depicted in more detail in FIG. 7.

Figure 3:
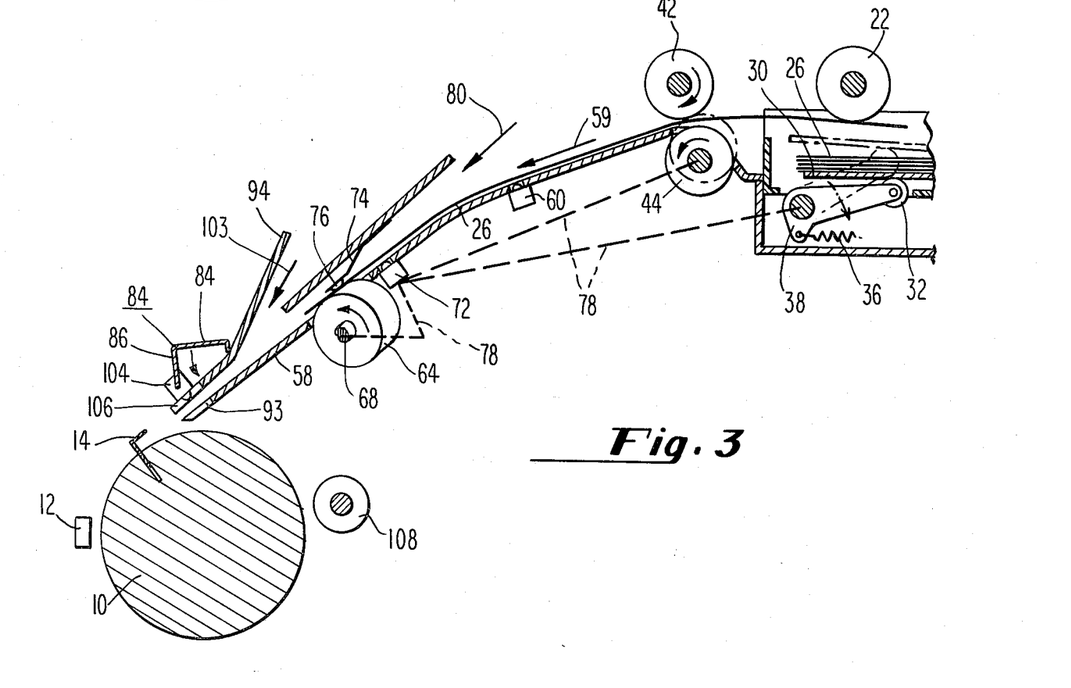
FIG. 3 is a sectional view of FIG. 2 showing the sheet feeding sequence a short time later.
Figure 11:
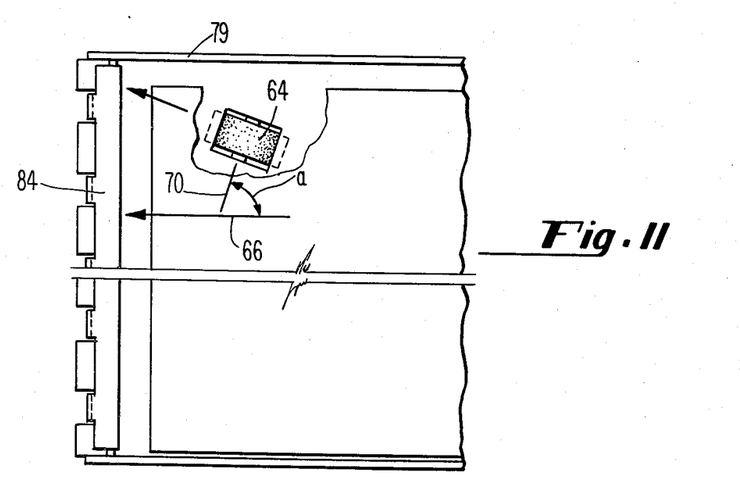
FIG. 11 is a plan view of the document positioning apparatus shown in FIGS. 1 through 4 and 6.

Referring now to FIG. 3, an important aspect of the invention of copending application Ser. No. 120,339 filed Feb. 11, 1980, will now be described. In FIG. 3, the sheet 26 has been advanced along the inclined guide 58 by the rollers 42 and 44 to the point that the sheet 26 is engaged by a forward sheet feed mechanism including a roller 64 which moves the sheet 26 longitudinally along the path established by the guide 26 and laterally with respect to that path. This longitudinal and lateral motion provided by the roller 64 is achieved by mounting the roller 64 on an axis which forms an angle with the longitudinal path of the sheets 26 of less than 90° as shown in FIG. 11. Preferably, the angle a as shown in FIG. 11 lies in the range of 55° to 75° with approximately 72° being preferred. In FIG. 11, the longitudinal path is depicted by a line 66 and the axis of rotation for the roller 64 which coincides with a shaft 68 illustrated in FIG. 3 is depicted by a line 70.

As shown in FIG. 3, the rollers 42 and 44 located rearwardly of the roller 64 are disengaged from the sheet 26. Furthermore, the elevating plate 30 has been lowered by lowering the roller 32 such that the topmost sheet 26 and the stack 28 is not in contact with the roller 22. This prevents any further feeding of sheets 26 and the stack 28 and also permits a sheet 26 in contact with the roller 64 to be moved laterally without restriction by the previous engaged rollers 42 and 44. This disengagement of the roller 42 and 44 and the lowering of the plate 30 is accomplished by the sensing of the forwardmost portion of the sheet 26 by a sensor 72 in an opening 73 located immediately adjacent the roller 64 as depicted by a dotted line 78. When the forwardmost portion of the sheet 26 is detected by the sensor 72, this disengagement of the rollers 42 and 44 and the lowering of the plate 30 is accomplished. At this point in time, movement of the sheet 26 is controlled solely by the roller 64 in conjunction with a leaf spring 74 mounted on a guide member 71 carrying a contact point 76 which assures good frictional engagement of the sheet 26 by the roller 64 which passes along a path between the contact 76 and the roller 64 as shown in FIG. 3. The sensor 72 also is effective to actuate the roller 64 as depicted by the dotted line 78 in FIG. 3.

As also shown in FIG. 11, the transport path includes a longitudinal guide 79 extending along the longitudinal path depicted by the line 66. When the roller 64 engages the sheet, the sheet is driven toward the longitudinal guide 79 so as to assure that the sheet is properly laterally positioned with respect to the drum 10 and the clamp 14 of the drum as shown in FIG. 11.

In accordance with another important aspect of aforesaid copending application Ser. No. 120,339 filed Feb. 11, 1980, another sheet feed path 80 merges with the path 59 from the cassette 18 previously discussed so as to permit the sheets fed by both paths 59 and 80 to be engaged and laterally positioned by the sheet positioning roller 64. In this regard, reference is made to FIG. 1 wherein a path 80 is provided by an inclined guide 82 for hand feeding of single sheets to the roller 64. In this regard, it will be appreciated that the hand feeding relies upon gravity to move the sheets along the guide 82 in the direction indicated by the sheet transport arrow 80. Once the sheets moving along the path 80 as well as the sheet moving from the cassette 18 along the path 59 are engaged by the roller 64, the sheets remain under the control of that roller to laterally position the sheets against the guide 78 shown in FIG. 11 while moving the sheets forward to the drum 10.

Figure 6:
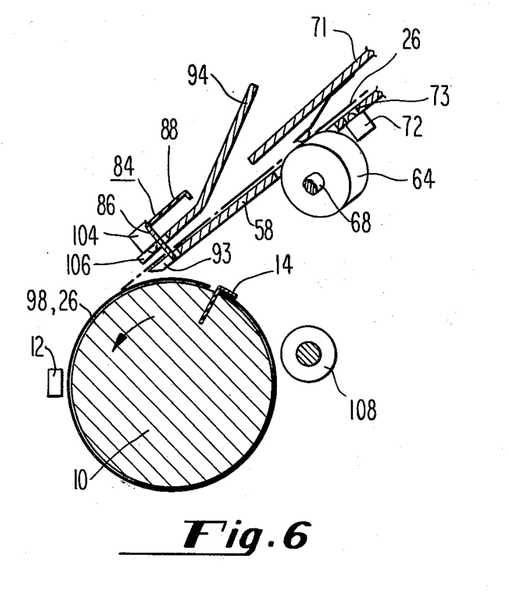
FIG. 6 is a sectional view of a portion of the apparatus shown in FIG. 5 a short time later in the sheet feeding sequence.
Figure 7:
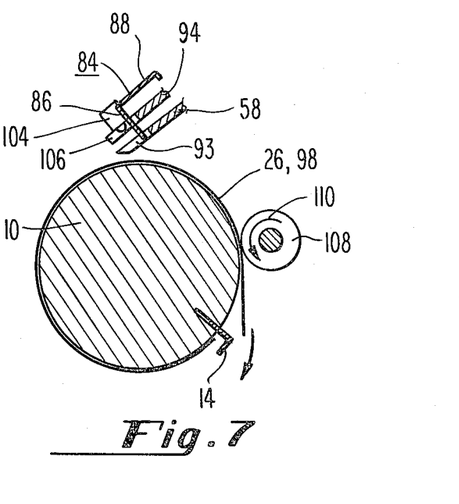
FIG. 7 is a sectional view similar to FIG. 6 a short time later in the sheet feeding sequence.

In accordance with another important aspect of copending application Ser. No. 120,339 filed Feb. 11, 1980, a gate 84 is located down stream of the roller 64 as shown in FIGS. 1-3. The gate 84 as shown in FIGS. 1 and 6 is adapted to close so as to hold back sheets 26 which are fed toward the drum 10 until the proper time for feeding the sheets to the drum 10. Note that the sheet is shown in phantom against the gate 84 in FIG. 1. The gate 84 is principally used in conjunction with the single-sheet feed path 80 for the following purpose. Where it is desirable to have sheets 26 ready to be fed to the drum 10 just as soon as the drum 10 is ready to receive the next sheet 26, the gate may be moved to the closed position as shown in FIGS. 6 and 7 so as to permit an operator to feed a sheet along the single-sheet feed path 80 in advance of the time in which the drum 10 is ready to receive the sheet, i.e., while the sheet on the drum is still being scanned. This assures that the sheet is ready to be placed on the drum 10 as soon as the clamp 14 is in the position shown in FIGS. 1-3. Of course, by virtue of the canted mounting of the roller 64, sheets which are advanced to the closed gate 84 are properly laterally positioned with respect to the guide 79.

Figures 4, 5:
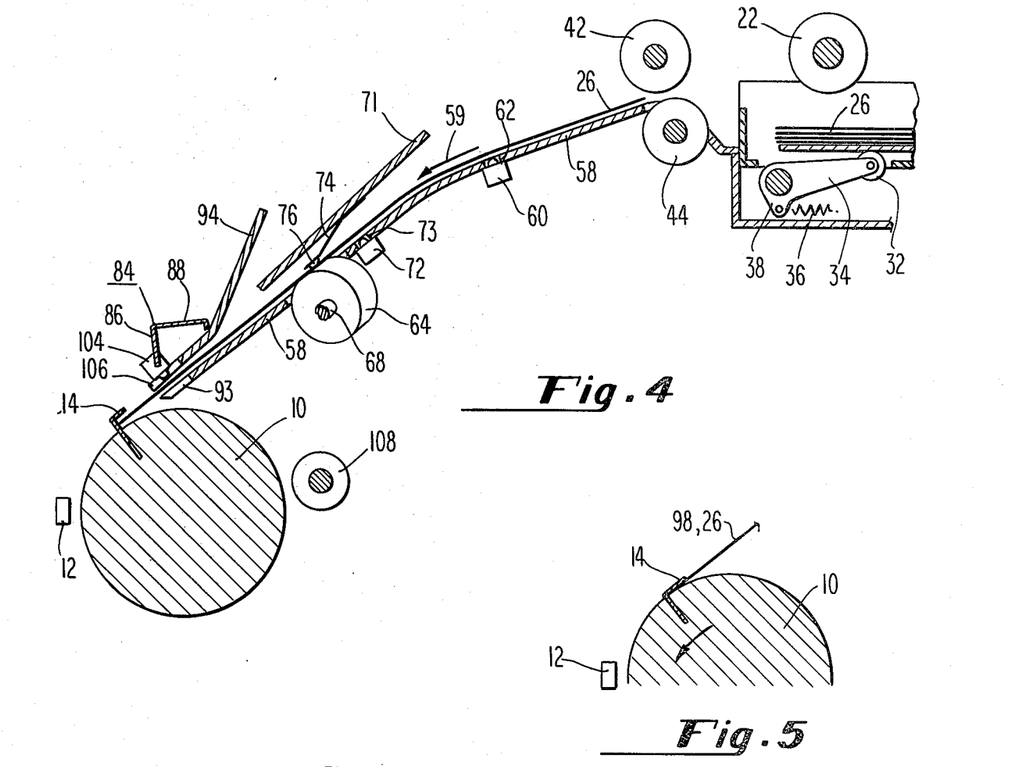
FIG. 4 is a sectional view of FIG. 3 showing the sheet feeding sequence a short time later.
FIG. 5 is a sectional view of the apparatus shown in FIG. 4 a short time later in the sheet feeding sequence.

As shown in FIG. 11, the gate 84 preferably extends along the entire width of each sheet 26. As shown in FIG. 1, the gate includes an "L" shaped structure having a stop surface 86 and a connective arm 88. The arm 88 is free to pivot about a point 90 in response to the actuation of a solenoid 92. The solenoid 92 is mounted on a supporting surface 94 which defines yet another feed path which will be described subsequently. When the solenoid 92 is retracted as shown in FIGS. 2-4, the stop surface 86 of the gate 84 is open. When the solenoid 92 is in the extended position, the gate 84 rotates about the pivot point 90 so as to place the stop surface 86 in the closed position extending through an opening 93 in the guide 58.

From the foregoing, it will be understood that a sheet 26 as shown in FIG. 6 is fed to the gate 84. While the sheet 26 is against the gate 84, another sheet 26 located on the drum 10 as shown in FIG. 6 is being scanned by the rotational motion of the drum 10 and the movement of the scanning head 12. Once the sheet 26 located on the drum 10 is removed from the drum as depicted in FIG. 7, the drum 10 is free to rotate to a position such that the open clamp 14 is aligned with the feed path adjacent the gate 84. Only at this time will the gate 84 be moved to the open position so as to allow the sheet 26 under the control of the roller 64 to advance into the clamp 14. Once the sheet 26 is on the drum 10, and the gate 84 may again be closed and await receipt of the next sheet 26 fed to the gate 84 by the operator with the assistance of the roller 64.

Referring again to FIG. 1, another sheet feed path 95 is provided from yet another cassette 96. The cassette 96 is inclined and located above the single sheet feed path 80 and the multisheet storage area 16. The cassette 96 also includes a multisheet capacity. In order to individually feed the sheets 98 from the cassette 96, a scuff roller 100 engages the sheets 98 near the leading edge. The uppermost sheet 98 is held in contact with the scuff roller 100 by means of a leaf spring 102 mounted on a plate 103 which forces a plate 104 upwardly toward a scuff roller 100. The sheets from a cassette 96 are driven downwardly under the influence of the roller 100 along the support member 94 toward the drum 10.

It will therefore be appreciated that there are three separate sheet feed paths to the drum 10 although the last-mentioned feed path does not pass the roller 64. Accordingly, the sheets 98 are not subject to the lateral positioning, and it is therefore important that the cassette 96 be properly constructed so as to reliably permit the removal of the sheets 98 from the cassette 96 in the appropriate lateral position. This may be accomplished by utilizing, for example, plastic separator sheets between the sheets 98 having openings through the separator sheets so as to permit engagement of a roller 100 with each individual sheet 98 in accordance with prior art practices. Of course, it will be appreciated that the plastic separator sheets will provide low resistance to movement of the sheets 98 from the cassette 96.

In accordance this invention, another sensor 104 located adjacent an opening 106 through which the gate 88 passes as shown in FIGS. 1-4. The sensor 104 is utilized in connection with the circuitry which will be described with reference to FIGS. 14, 14a and 15 to sense the length of sheets moving along transport paths 95 and 80 which merge in advance of the sensor 104.

In order the remove the sheets from the clamp 14, it becomes necessary to engage the sheets at or near the trailing edge of the sheet. This requires the position of the trailing edge of the sheet to be known so that the drum 10 can be rotated to a position such that the sheet removing means in the form a roller 108 as shown in FIGS. 1-4, 6 & 7 is appropriately position with respect to the trailing edge of the sheet 26. More particularly, as shown in FIG. 7, the drum 10 must be rotated to a position such that the trailing edge is juxtaposed to the roller 108. Except for rotational motion indicated by an arrow 110 as provided by a motor driven pully 113 and a belt 115 as shown in FIG. 1 and slight motion toward the drum 10, this roller 108 is stationary, i.e., the roller 110 does not move peripherally around the drum 10.

As shown in FIG. 6, the sheet 26 is being scanned by the head 12 as the drum 10 rotates. At the conclusion of scanning, the drum is automatically rotated to a rest position such that the trailing edge 111 is located adjacent the roller 108 as shown in FIG. 7. The roller 108 is then moved into a position of engagement with the sheet 26 and rotation begins as depicted by the arrow 110 so as to strip the sheet 26 from the drum 10. Throughout this period of time, the gate 84 as shown is closed so as to prevent the feeding of sheets onto the drum 10 since the drum 10 is not in a position to receive sheets due to the nonalignment of the clamp 14 with the various transport feed paths 59, 80 and 95. The clamp 14 is also advantageously used to hold sheets fed along the path 59 in a state of readiness for feeding to the drum so as to minimize delay when single sheet feeding.

Figure 12:
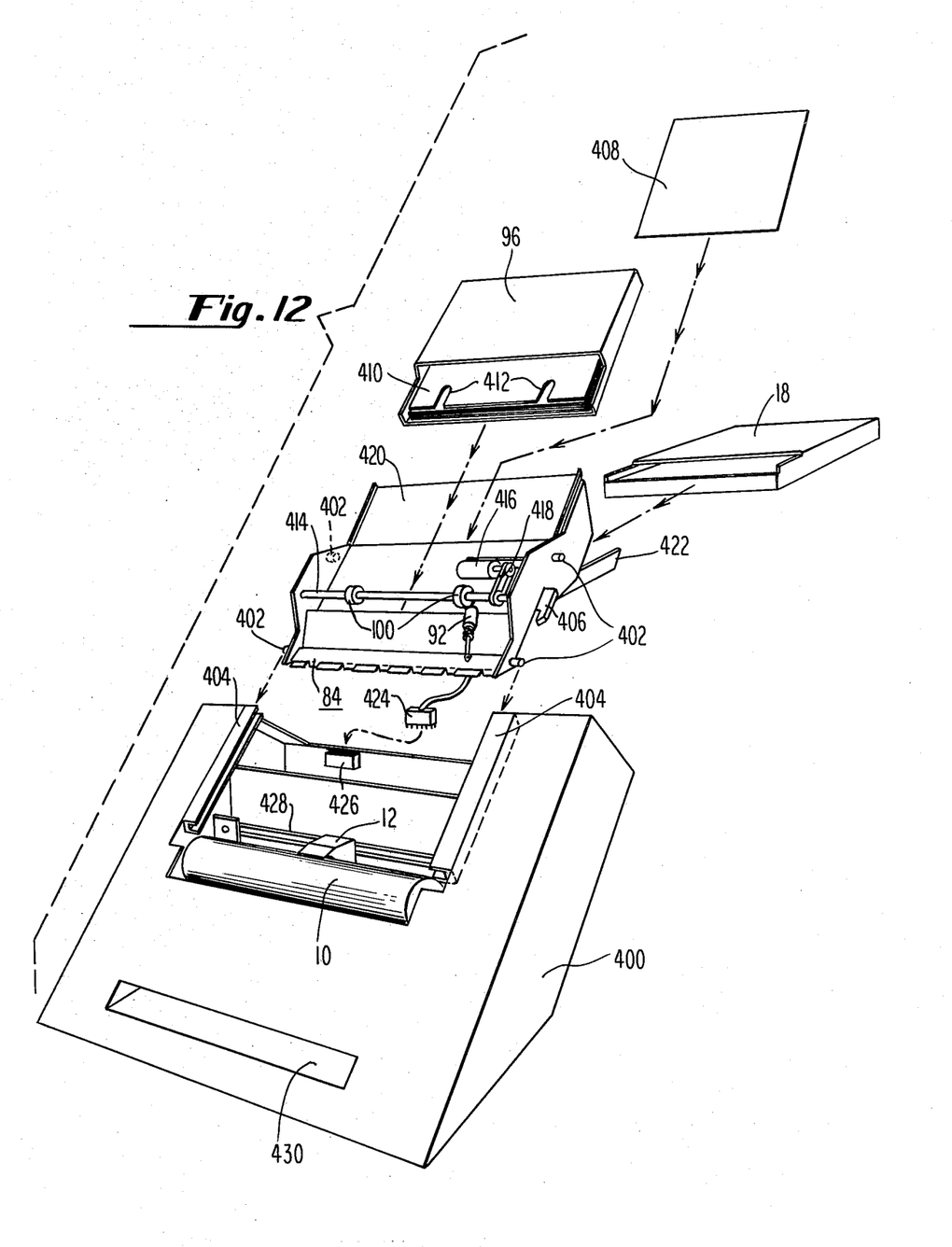
FIG. 12 is an exploded perspective view of the equipment incorporating the apparatus of FIG. 1.

Referring to FIG. 12, an important aspect of copending application Ser. No. 120,462 filed Feb. 11, 1980 is disclosed. In particular, the safe and separable nature of the feed mechanism shown in FIGS. 1 through 7 from a base unit 400 in which the drum 10 and the head 12 are mounted.

It will be appreciated that the sheet feeding mechanism is entirely separable from the base unit 400 which is adapted to receive pins 402 of the sheet feeding mechanism in tracks 404. An interlock mechanism including a can 406 is adapted to interact with a switch mounted adjacent the track 404 not shown in FIG. 12.

The separable nature of the cassette 18 and the cassette 96 from the sheet feeding mechanism is also illustrated in FIG. 12. A sheet 408 adapted to be fed on a singular sheet-by-sheet basis is also shown in FIG. 12.

The cassette 96 is shown as clearly comprising separator sheets 410 having elongated openings 412 adapted to receive the rollers 100 which are mounted on a shaft 414. A motor 416 drives the shaft 414 to a belt 418.

The cassette 96 may be readily inserted into the sheet feeding mechanism along a guide surface 20. Similarly, the cassette 18 may be loaded into the feed mechanism along a guide means 422 only partially shown.

Prior to sliding the pins 402 into the tracks 404 of the base 400, the feed mechanism is interconnected with the base unit by means of a plug 424 which is received by a jack 426.

The base unit 400 also includes a head drive mechanism comprising a belt 428. The belt 428 is moved by means of a head motor not shown so as to produce a linear scanning motion along the drum. After the head 12 has scanned the drum 10 and the sheet on the drum 10 is stripped in accordance with this invention, the sheet exits the base unit 400 through an elongated opening 430.

Figure 13:
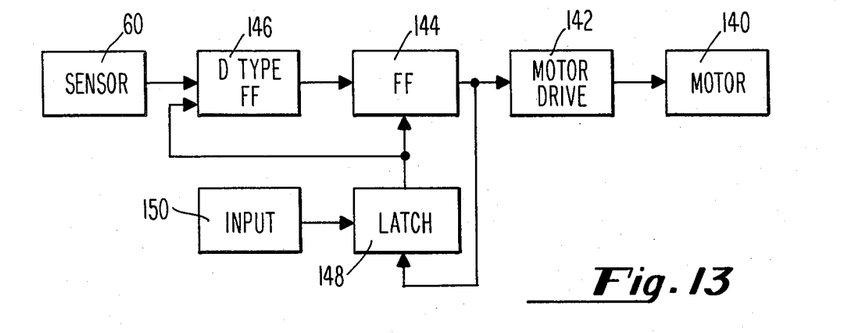
FIG. 13 is a block diagram of a motor control circuit for controlling the feed mechanism of FIGS. 1 through 7.

Reference will now by made to FIG. 13 for a discussion of the control of the roller 22 and the roller 42 and 44 in response to the sensing of a sheet by the sensor 60. A motor 140 drives the roller 22 and the rollers 42 and 44 in response to the output of a motor drive circuit 142 which is under the control of a flip-flop 144. The input to the flip-flop 144 is connected to the output of a "D" type flip-flop 146. The flip-flop 144 is reset by a latch 148 which also serves as the data input to the flop-flop 146. The "D" type flip-flop 146 is strobed by the sensor 60.

In response to an input signal from an input circuit 150, the latch 148 goes high and the flip-flop 144 is reset so as to enable the motor drive circuit 142 which in turn results in the rotation of the rollers 22, 42 and 44. The motor 140 continues to run until such time as the sensor 60 generates a positive-going pulse which triggers the "D" type flip-flop 146 to set the flip-flop 144 and disable the motor drive 142 at the same time of setting the latch 148. At this time, the sheet 26 as shown in FIG. 2 remains stationary.

When the input circuit 150 generates another signal such as that from a remote transmitter indicating that it is time to resume the transport of the sheet 26, the latch 148 is again set resulting in the resetting of the flip-flop 144. This enables the motor drive 142 which energizes the motor 144 and rotates the rollers 22, 42 and 44. This advances the sheet 26 clear of the sensor 60 so as to produce a negative-going pulse. However, the "D" type flip-flop 146 is not responsive to the negative-going pulse.

It will be appreciated that the control circuit shown in FIG. 13 may be modified. One modification would be the use of a microprocessor suitably programmed in place of discrete logic circuitry.

Figure 14:
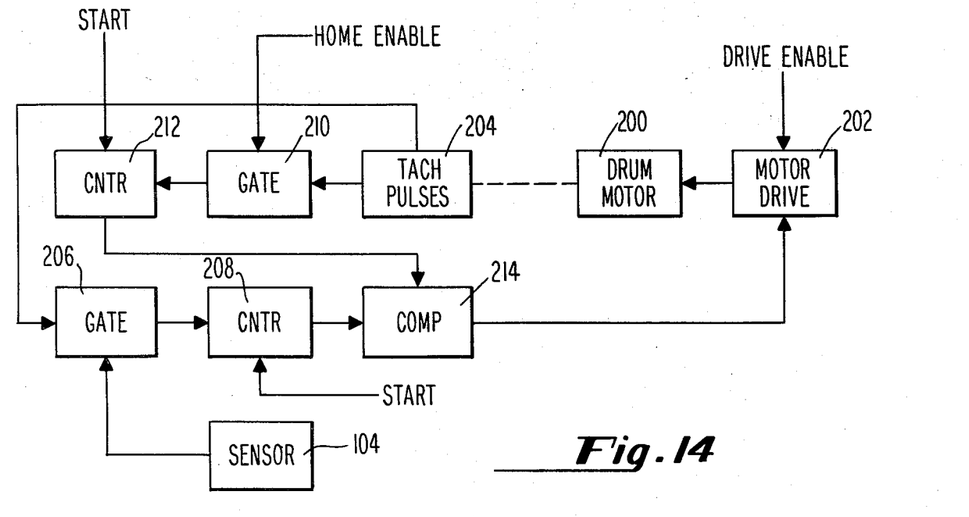
FIG. 14 is a block diagram of control circuitry utilized in properly positioning the drum for performing sheet stripping as shown in FIG. 7.
Figure 14A:
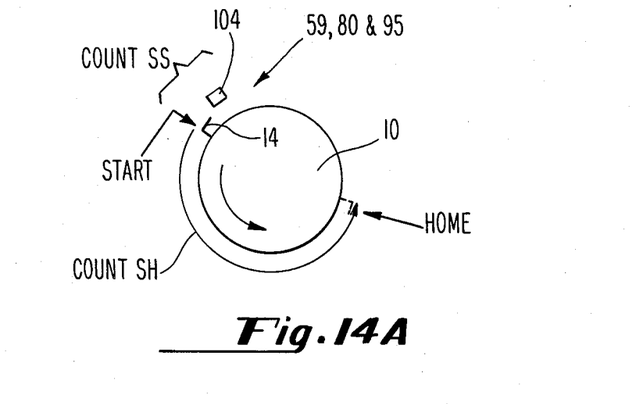
FIG. 14A is a schematic diagram of the drum which is used in conjunction with FIG. 14 to describe the operation thereof.

As shown in FIG. 14A, the drum 10 is located in a start position generally corresponding with alignment between the clamp 14 and the various feed paths 59, 80 and 95 which is the position shown for the drum in FIG. 1. The drum is also capable of assuming the home position, located approximately 203° away from the start position. The home position is chosen to substantially correspond with the correct stripping position when the drum 10 is carrying a document which is the standard 8½ inches wide as shown in FIG. 7.

Referring now to FIG. 14, a drum motor 200 which may comprise an AC synchronous motor is coupled to a conventional motor drive circuitry 202. After a sheet has reached the clamp 14 as shown in FIG. 14a and the clamp has been closed as shown in FIG. 5, rotation of the drum begins and tach pulses are generated by a tach pulse source 204 coupled to the drum motor 200. When the gate 206 is enabled by the sensor 104, pulses are applied to a counter 208 which has been reset to 0 with a start signal coincident in time with the energization of the motor 200 which begins to move the clamp 14 from the start position as shown in FIG. 14a. Alternatively, motor drive pulses are counted directly instead of separate tach pulses. The count in the counter 208 continues to accumulate so long as the sensor 104 senses a sheet.

When the sensor 104 no longer senses this sheet, the gate 206 is inhibited and the count in the counter 208 ceases to advance and the count which remains is representative of the sheet length. For reasons which will be explained later, the counter 208 is preset to the count representing the number of tach pulses between the start position and the home position represented in FIG. 14A as count SH. In addition, where there is a substantial separation between the start position and the sensor 104, it may be desirable to increase the count SH by a count SS equivalent to the distance between the clamp 14 at the start position and the sensor 104. As a consequence, the actual count accumulated in the counter 208 at the time the gate 206 is inhibited by absence of the paper at the sensor 104 it will represent the overall length L of the paper plus the count corresponding to the distance from the start position to the home position plus the count corresponding to the distance between the clamp 14 at the start position and the sensor 104.

At the conclusion of a facsimile transmission, the count accumulated in the counter 208 is utilized for purposes of properly locating the trailing edge of the document in the following manner. A gate 210 which is also coupled to the source of tach pulses 204 applies tach pulses to a counter 212 when the gate is enabled by a home enable signal which is generated at the conclusion of a transmission. A counter 212 is reset by a signal generated whenever the drum clamp 24 passes the start position. As a consequence, once the gate 210 is enabled, the count which accumulates in the counter 212 will represent the position of the clamp as well as the leading edge of the sheet held under the clamp 14. The accumulating count in the counter 212 is constantly compared with the count stored in the counter 208 at a comparator 214.

When the total count in the counter 212 is equal to the count in the counter 208, the comparator 214 will produce an output which is applied to the motor drive 202 so as to disable the motor drive 202 and stop the drum 10.

Because of the state of the art in microprocessors, it may be preferred to implement the control technique performed by the discrete logic circuitry shown in FIG. 4 with a microprocessor. For this reason, the microprocessor flow chart shown in FIG. 15 will now be described where it is understood that the microprocessor is utilized in conjunction with the drum motor 200, the motor drive 202 and the sensor 104 shown in FIG. 14.

Figure 15:
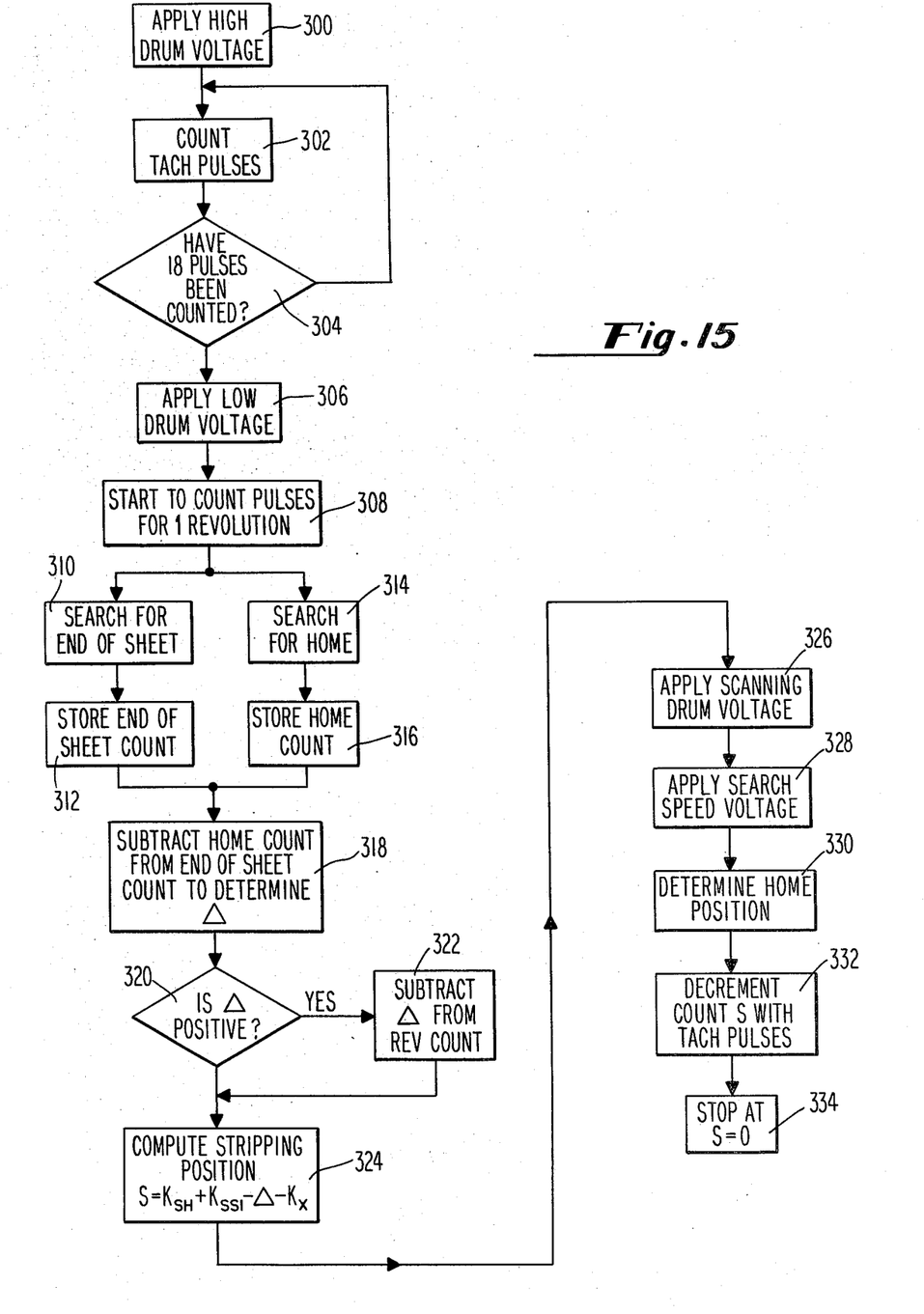
FIG. 15 is a flow chart used in describing the microprocessor embodiment for performing the control of the drum for the sheet stripping shown in FIG. 7.

Referring now to FIG. 15, a high drum voltage is initially applied as shown in block 300 at drum start up where the drum begins with the clamp in the start position as shown in FIG. 14A. Tach or motor pulses are counted as shown at block 302 until such time as 18 pulses have been counted as depicted by block 304.

When 18 tach pulses have been counted, the motor drum drive is switched so as to apply low drum drive voltage as depicted at block 306 and counting of pulses for one revolution is begun as depicted at block 308. As the tach pulses are counted, a search is made for the trailing edge or end of the sheet as depicted at block 310 and the count corresponding to the end of this sheet is stored as depicted at block 312. Simultaneously, the search is made to determine when the drum clamp 14 is in the home position as depicted by block 314 and the count corresponding to the home position is stored as depicted by block 316.

In order to compute a quantity $\Delta$, the home count is subtracted from the end of sheet count as depicted by block 318. If $\Delta$ is positive, the count corresponding to $\Delta$ is subtracted from the number of counts for a full revolution of the drum 10 as depicted by block 320 and 322.

The proper position for stripping the sheet from the drum 10 is now able to be computed. This is performed as depicted at block 324 in accordance with equation:

$$S = K_{SH} + K_{SS} - \Delta - K_X$$

where, $K_{SH}$ is a constant corresponding to the distance between the drum home position and the normal stripping position for a standard width paper, $K_{SS}$ is a constant corresponding to the distance between the start position and the sensor 104 and the $K_X$ is the distance from the drum home position to the start position. With the stripping information stored, the scanning proceeds by applying a drum scanning voltage from the motor drive 202 as depicted by the block 326. At the conclusion of scanning, a search speed voltage is applied as depicted at block 328. When the home position is passed as depicted by block 330, the count S is decremented as depicted by block 332 until such time as the count equals 0 is depicted by block 334. When the count S equals 0, the trailing edge of the sheet on the drum 10 will be properly positioned with the respect to stripping, i.e., adjacent the home position.

Although a particular embodiment of the invention has been shown and described, it will be appreciated that various modifications may be made which will occur to those of ordinary skill in the art without departing from the true spirit and scope of the invention.

What is claimed is:

1. Facsimile apparatus comprising scanning means adapted to scan a sheet and improved sheet transport means comprising:
   a transport path for feeding sheets to said scanning means;
   feed means in said transport path for moving said sheets along said path to said scanning means; and
   means including sensor means in said transport path for determining the length of said sheets.

2. The facsimile apparatus of claim 1 wherein said scanning means comprises a rotatable drum for carrying a sheet transported to said scanning means, said transport means including means for engaging a sheet carried by said drum for removing said sheet from said drum and means for controlling the position of said drum in response to said sensor means so as to position one edge of said sheet adjacent said means for removing said sheet.

3. The facsimile apparatus of claim 2 wherein said means for removing a sheet comprises a roller.

4. The facsimile apparatus of claim 2 wherein said drum includes a clamp for engaging another edge of sheet opposite said one edge.

5. The facsimile apparatus of claim 1 wherein said feed means comprises plural sheet transport paths.

6. The facsimile apparatus of claim 5 wherein said plural transport paths merge at a point in advance of said sensor means.

7. The facsimile apparatus of claim 6 wherein said sensor means is located adjacent said drum.

8. A method of operating a facsimile apparatus comprising scanning means adapted to scan a sheet, sheet transport means adapted to feed a sheet along the transport path to the scanning means, sheet sensor means in the transport path and sheet removal means for removing sheets from the scanning means, the method comprising the following steps:
- feeding a sheet along the transport path;
- feeding the sheet to the scanning means;
- sensing the trailing edge of the sheet as the sheet moves along the transport path;
- determining the length of the sheet as the sheet moves past the sensor means;
- scanning the sheet at the scanning means; and
- positioning the sheet removal means relative to the scanning means so as to locate an edge of the sheet adjacent said removal means.

9. The method of claim 8 wherein feeding of the sheet is at a substantially constant velocity; and
- determining the length of sheet includes timing the interval between arrival of said sheet at said scanning means and the sensing of said trailing edge while said sheet is moving at a substantially constant velocity.

10. The method of claim 8 wherein the sheet, is advanced along the transport path with a leading edge first passing the sensor means and a trailing edge later passing the sensor means.

11. The method of claim 9 wherein said edge adjacent said removal means is the trailing edge.

12. The method of claim 11 wherein said scanning means comprises a drum including a clamp and further including the step of clamping said sheet on said drum.

13. The method of claim 12 wherein scanning comprises rotating said drum.

14. The method of claim 13 wherein the drum is rotated to align the clamp to the transport path prior to scanning.

15. The method of claim 14 wherein the drum is rotated after scanning to align the trailing edge of the sheet with the sheet removal means.

* * * * *